J. P. MacLEAN.
SHOCK ABSORBER.
APPLICATION FILED JAN. 12, 1917.
1,306,016.
Patented June 10, 1919.
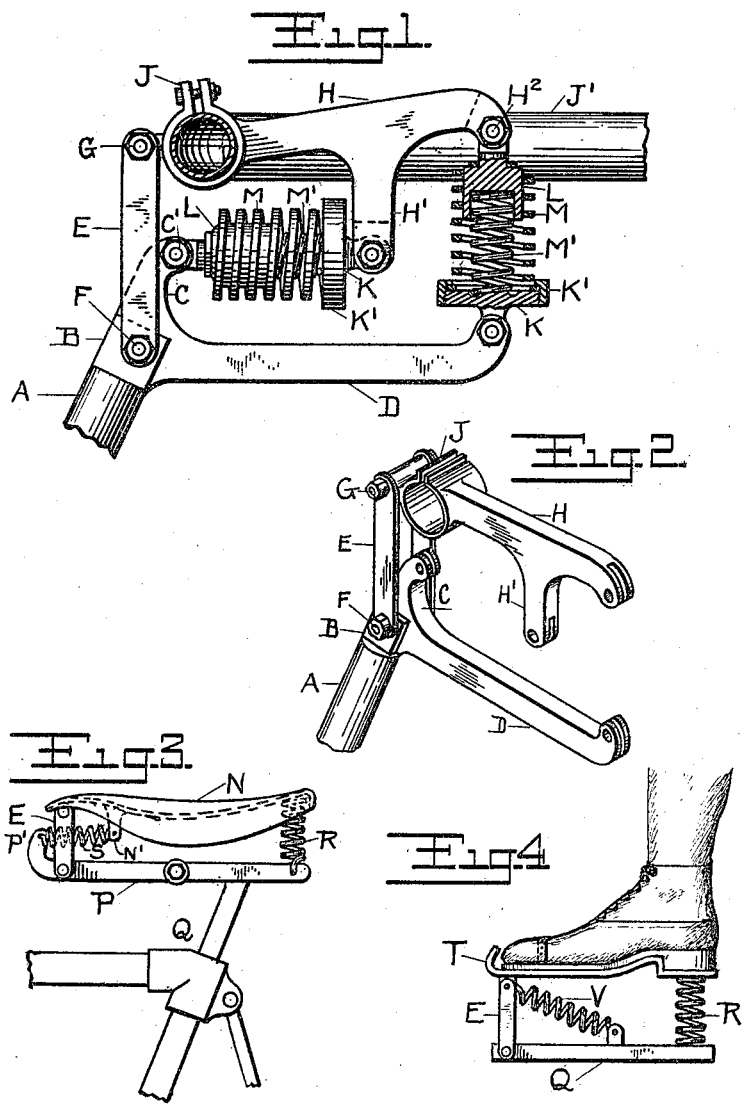
Inventor
John Percy MacLean
By his Attorney

UNITED STATES PATENT OFFICE.

JOHN PERCY MacLEAN, OF HAMILTON, NEW SOUTH WALES, AUSTRALIA.

SHOCK-ABSORBER.

1,306,016.    Specification of Letters Patent.    Patented June 10, 1919.

Application filed January 12, 1917. Serial No. 141,927.

*To all whom it may concern:*

Be it known that I, JOHN PERCY MAC-LEAN, a subject of the King of Great Britain, residing at Veda street, Hamilton, in the State of New South Wales, Commonwealth of Australia, have invented new and useful Improvements in Shock-Absorbers, of which the following is a specification.

My invention relates to shock absorbers for motor vehicles; and has for its object to provide improved means for absorbing or cushioning forward and backward shock, as well as vertical shock, and preventing the same from reaching the supported member, which may be, for instance, the handle bar, saddle or foot rest of a motor cycle, or the body of an automobile. The present invention comprises an improvement on the device shown in my Patent Number 1,183,389, dated May 16, 1916.

My invention consists in the construction, combination and arrangements of parts herein illustrated, described and claimed.

In the accompanying drawings, in which similar reference characters designate corresponding parts in all figures, I have shown my invention as applied to a motor cycle. In these drawings, Figure 1 is a side elevation, partly in section, of a device embodying my invention as applied to the handle bars of a motor cycle;

Fig. 2 is a perspective view of the device shown in Fig. 1 with certain parts removed;

Fig. 3 is a side elevation of the device embodied in a motor cycle saddle; and

Fig. 4 shows the invention applied to a motor cycle foot rest.

Referring to Figs. 1 and 2, A designates the steering stem of a motor cycle to which is secured a crown cap B, which may have a pillar or arm C extending upward therefrom, and a tiller or rearward extension D. Links E may be pivotally secured to the crown cap B by means of bolts F, and at their upper ends by bolts G to a supported member H, to which the handle bars $J^1$ are attached by means of the usual clamp J.

The supported member H extends rearwardly to a point approximately over the rear end of the tiller D, to which it is connected by a link, which may preferably be a spring or a system of springs M, $M^1$, adapted to absorb and cushion vertical shock.

Interconnected between the arm C of the crown cap B or other part of the supporting member A and a portion of the supported member H in approximately the same forward and backward line, such as the downwardly extending arm $H^1$ of Figs. 1 and 2, is a resilient member, as springs M, $M^1$, adapted to yield under forward and backward vibration and shock in such a way as to absorb or cushion the shock and prevent it from passing from the supporting to the supported member.

This resilient member, and that shown in Fig. 1 between the tiller D and rear of the supported member H, may comprise a base K adapted to be pivotally attached to one of the members, and provided with a seating surface for a helical spring $M^1$; and a thimble L arranged to receive the other end of the spring $M^1$, and adapted to be pivotally attached to the other member. This spring will tend to hold the base K and thimble L apart, and will preferably be of rather light weight so as to yield somewhat under the ordinary vibrations of the vehicle to which the device is attached.

Encircling the spring $M^1$ is a heavier spring M, which may be secured to the base K by an annular inwardly flanged cap $K^1$ adapted to be screwed upon the base and to clamp the end convolution of the spring M, which is preferably of somewhat larger diameter than the rest, between its flange and the base K.

The thimble L, between its point of pivotal attachment, and the seat for the spring $M^1$, has a reduced portion extending axially thus forming a shoulder; and the spring M has its coils at this end reduced in diameter to fit over the reduced portion, and bear against the said shoulder, thus tending to prevent the thimble L and base K from being pulled apart and releasing the spring $M^1$.

At the end of the reduced portion opposite to the said shoulder is a shoulder faced in the opposite direction, which is preferably the member H or C to which the thimble is attached by means of bolts $H^2$ and $C^1$, respectively. The end coils of the heavy spring M are thus free to slide upon the reduced portion between the two shoulders, but the spring is compressed by, and tends to resist, further relative motion of the parts K and L when the spring comes into contact with either shoulder.

In Fig. 3 is shown a saddle N, which is connected through links E with a supporting member P, which may conveniently be bolted to the frame Q of the machine, and through springs R at the rear adapted to absorb vertical shock and vibration. The saddle N may have a downward projection N¹, and the supporting member P an upward projection P¹, these projections terminating in approximately the same horizontal plane, and one some distance in front of the other. Between these projections is disposed a resilient member S, which may be a spring or system of springs such as described in connection with Fig. 1, or other suitable type adapted to absorb the shock and vibration of the supporting member in a horizontal direction, and cushion the same.

In Fig. 4 is shown a foot rest T for a motor cycle, which may be formed in any convenient manner, for instance, pressed from metal to the required shape, connected at its forward end through links E with the frame Q of the motor cycle, and at its rear through a spring R adapted to absorb vertical shock. A spring V may be connected at one end to the foot rest, preferably at its forward part, and at the other end to the frame Q, preferably at a point rearward of the point at which it is connected to the foot rest T.

Having now described my invention, I claim and desire to secure by Letters Patent of the United States:

1. In a shock absorber for motor vehicles and the like, the combination comprising a supporting member, a supported member arranged above said supporting member, links extending upward from said supporting member to said supported member, permitting relative forward and backward movement of said members, certain of said links having resilient means associated therewith whereby said members may have relative up and down movement, and resilient means interposed directly between said members positioned to cushion forward and backward movement.

2. In a motor cycle, the combination comprising a frame, a handle bar, links interconnecting said handle bar and frame and allowing forward and backward movement and up and down movement of the handle bar with respect to the frame, and resilient means associated with the links and interposed directly between said handle bar and frame for cushioning said motion.

3. In a shock absorber for motor vehicles and the like, the combination comprising a supporting member, a supported member, and links interconnecting said members and allowing relative forward and backward and up and down motion thereof, a plurality of the links having springs associated therewith whereby said links are longitudinally resilient, one of said last-mentioned links being compressible along a line substantially in a horizontal plane.

4. In a shock absorber for motor vehicles and the like, the combination comprising a supporting member, a supported member, and links interconnecting said members and allowing relative forward and backward and up and down motion thereof, a plurality of the links having springs associated therewith whereby said links are longitudinally resilient, these latter links being interposed directly between the two said members for cushioning said motions, one of the links being substantially vertical and the other substantially horizontal in a plane between the top and bottom of the substantially vertical link.

5. Means for absorbing vibration and shock between two members, comprising a spring disposed between said members and tending to hold them apart, and a spring fixed to one of said members and slidable upon the other, said other member having shoulders to limit the movement of the second spring and bring the same into action.

In testimony whereof I have signed my name to this specification.

JOHN PERCY MacLEAN.

Copies of this patent may be obtained for five cents each, by addressing the "Commissioner of Patents, Washington, D. C."